United States Patent [19]

Toriumi et al.

[11] Patent Number: 4,621,272
[45] Date of Patent: Nov. 4, 1986

[54] PHOTOSENSITIVE MEDIUM CASSETTE-RECEIVER SYSTEM

[75] Inventors: Shiro Toriumi, Zama; Seiichi Yamagishi; Yukiyoshi Yamakoshi, both of Machida; Kenjiro Ishii, Sagamihara; Yutaka Maeda, Mitaka, all of Japan

[73] Assignee: Minolta Camera Kabushiki Kaisha, Osaka, Japan

[21] Appl. No.: 675,070

[22] Filed: Nov. 26, 1984

[30] Foreign Application Priority Data

Nov. 30, 1983 [JP] Japan ................... 58-227194

[51] Int. Cl.[4] .............. G03B 27/58; G03B 17/26; G01D 9/42; G01D 15/28
[52] U.S. Cl. ................. 346/134; 346/107 R; 354/275; 355/72
[58] Field of Search ............ 346/107 R, 108 R, 134; 355/72, 3 SH, 14 SH, 24; 354/275

[56] References Cited

U.S. PATENT DOCUMENTS 3,628,864 12/1971 Fessenden .................. 355/18 X

Primary Examiner—E. A. Goldberg
Assistant Examiner—Gerald E. Preston
Attorney, Agent, or Firm—Wenderoth, Lind & Ponack

[57] ABSTRACT

An arrangement for detachably receiving a cassette containing photosensitive film sheets, which includes a drive device for driving a light shielding cover of the cassette, an electrical lock device for locking the cassette on the basis of an electrical signal detecting that an opening of the cassette is uncovered by the light shielding cover, and a mechanical lock device for locking the cassette such that locking of the cassette by the mechanical lock device is cancelled upon manipulation of the mechanical lock device.

11 Claims, 4 Drawing Figures

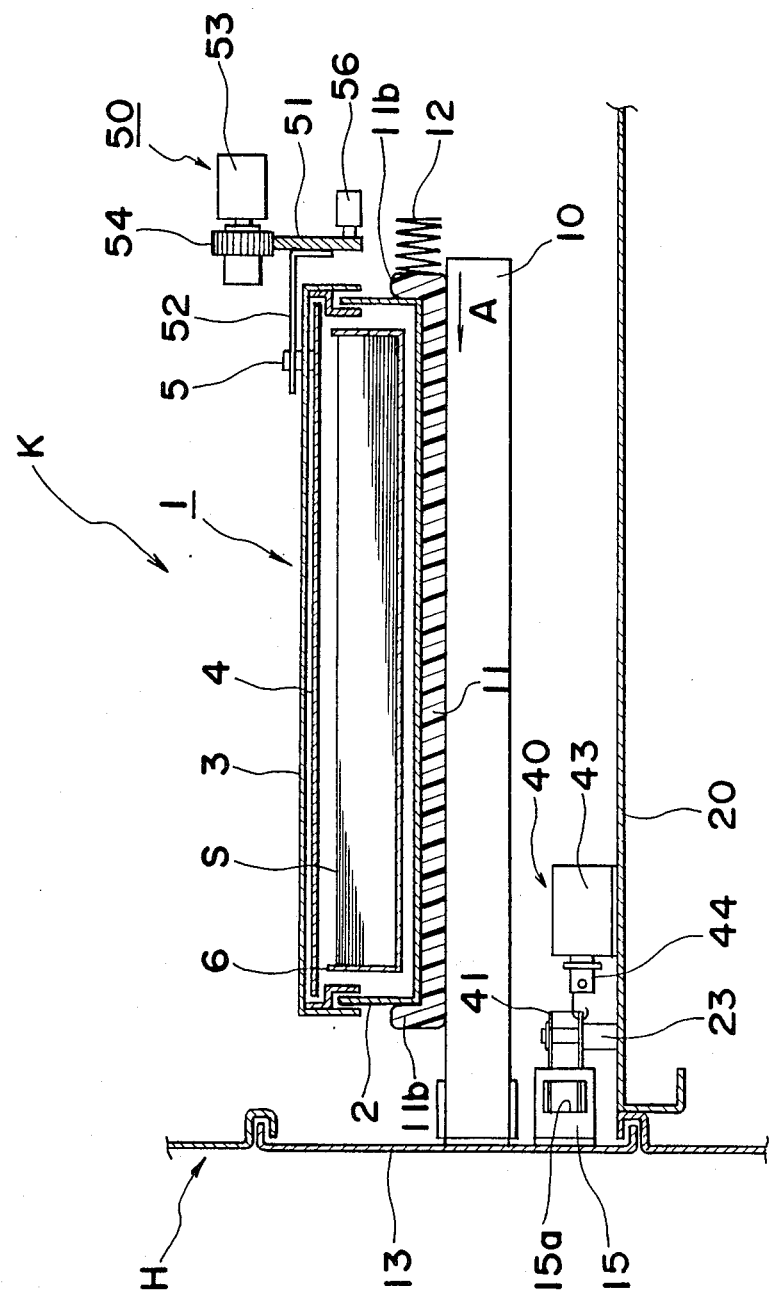

PHOTOSENSITIVE MEDIUM CASSETTE-RECEIVER SYSTEM

BACKGROUND OF THE INVENTION

The present invention generally relates to printers and more particularly, to an arrangement for detachably receiving a cassette containing photosensitive film sheets for use in a laser beam printer and the like.

Conventionally, in laser beam printers, X-ray cameras, etc. in which photosensitive film sheets are subjected to exposure of images so as to record the images, an arrangement is provided wherein a supply cassette for supplying the film sheets to an exposure portion and a take-up cassette for receiving the film sheets having been subjected to exposure are, respectively, formed with outlet and inlet openings. In order to eliminate erroneous exposure of the film sheets, the outlet and inlet openings are, respectively, provided with light shielding covers for selectively covering and uncovering the outlet and inlet openings only when the film sheets are fed out of the outlet opening and into the inlet opening, respectively. However, the known apparatuses have certain in the case where the cassette is taken out of the apparatuses and when the light shielding cover uncovers each of the outlet and inlet openings, erroneous exposure of the film sheets takes place.

In order to prevent such erroneous exposure as described above, there has been proposed, for example, in Japanese Patent Laid-Open Publication No. 10733/1983 (Tokkaisho 58-10733), an X-ray camera including a cassette receiving arrangement for detachably receiving, through an aperture, a cassette formed with an opening for film sheets. The cassette receiving arrangement includes a door for selectively covering and uncovering the aperture, while the cassette includes a cover for selectively covering and uncovering the opening. It is so arranged in the known cassette receiving arrangement that when the aperture is covered by the door, the door is automatically locked and that when the opening of the cassette is covered by the cover, the door is automatically unlocked. However, the prior art cassette receiving arrangement has a disadvantage in that since the locking and unlocking operations of the door are electrically controlled, on the basis of detection signals indicating that the opening of the cassette is covered or uncovered by the cover, etc., it is impossible to take the cassette out of the aperture when electric power is not supplied to the prior art cassette receiving arrangement. Namely, when electric power is not supplied to the prior art cassette receiving arrangement due to service interruption, mechanical failures, etc., the film sheets cannot be taken out of the opening of the cassette. In other words, the known cassette receiving arrangement has such a serious drawback that the film sheets cannot be supplied to or taken out from the cassette.

SUMMARY OF THE INVENTION

Accordingly, an essential object of the present invention is to provide an improved arrangement for detachably receiving a cassette containing photosensitive film sheets, by which erroneous exposure of the film sheets can be positively prevented and the cassette can be loaded into or taken out of the arrangement at all times, even when electric power is not supplied to the arrangement, with substantial elimination of the disadvantages inherent in conventional arrangements of this kind.

In accomplishing these and other objects according to one preferred embodiment of the present invention, there is provided an improved arrangement for detachably receiving a cassette containing photosensitive film sheets, with said cassette being formed with an opening for passing the photosensitive film sheets therethrough and including a light shielding cover for selectively covering and uncovering said opening, said arrangement comprising: a drive means for driving said light shielding cover such that said light shielding cover selectively covers and uncovers said opening; an electrical lock means for locking said cassette on the basis of an electrical signal detecting that said opening is uncovered by said light shielding cover; and a mechanical lock means for locking said cassette such that locking of said cassette by said mechanical lock means is cancelled upon manipulation of said mechanical lock means.

In accordance with the present invention, when the opening of the cassette is uncovered by the light shielding cover, the cassette is locked by the electrical lock means, so that erroneous exposure of the film sheets when the cassette is inadvertently taken out of the arrangement is prevented.

Furthermore, in accordance with the present invention, when the opening of the cassette is covered by the light shielding cover, locking of the cassette by the electrical lock means is automatically cancelled and locking of the cassette by the mechanical lock means is cancelled upon manipulation of the mechanical lock means, whereby it becomes possible to take the cassette out of the arrangement even when electric power is not supplied to the arrangement.

BRIEF DESCRIPTION OF THE DRAWINGS

These and other objects and features of the present invention will become apparent from the following description taken in conjunction with the preferred embodiment, in which:

FIG. 4 is a cross-sectional view taken along the line IV—IV in FIG. 3.

Before the description of the present invention proceeds, it is to be noted that like parts are designated by like reference numerals throughout several views of the accompanying drawings.

DETAILED DESCRIPTION OF THE INVENTION

Figure 1:
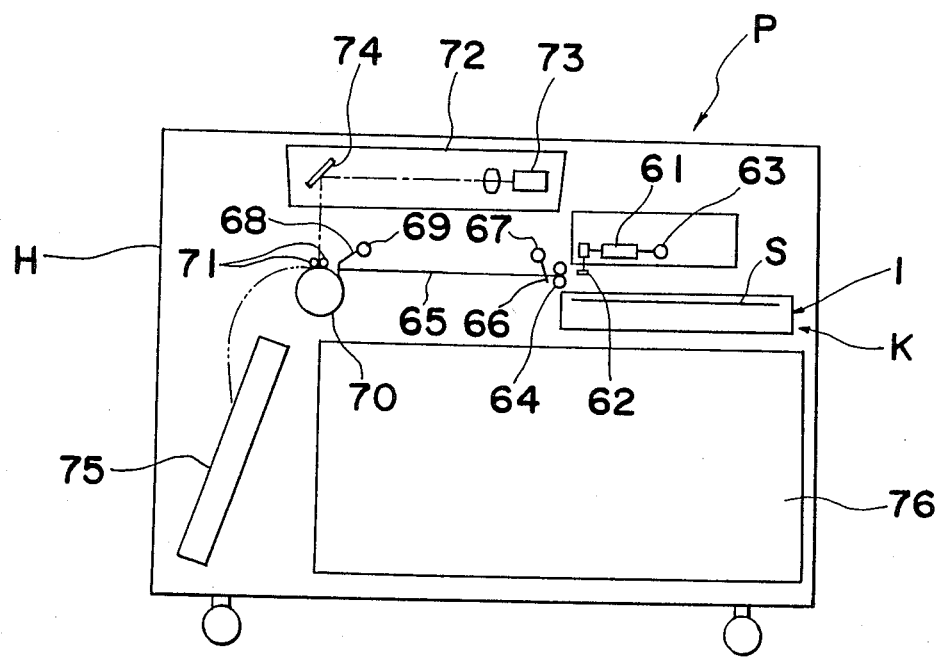
FIG. 1 is a schematic view of a laser beam printer in which a cassette receiving arrangement according to the present invention is incorporated.

Referring now to the drawings, there is shown in FIG. 1, a laser beam printer P in which an arrangement K for detachably receiving a supply cassette 1 containing photosensitive film sheets S, according to the present invention is incorporated. The photosensitive film sheets S are piled on one another in the supply cassette 1 such that photosensitive faces of the photosensitive film sheets S are oriented upwardly in FIG. 2. In the printer P, a suction pad 62 connected with an air cylinder 61 is provided above leading edges of the film sheets S. The suction pad 62 can be pivoted about a shaft 63 upwardly and downwardly. When the suction pad 62 is lowered so as to be brought into contact with an uppermost one of the film sheets S, the suction pad 62 sucks up the uppermost one of the film sheets S through an air sucking operation of the air cylinder 61 so as to lift up the leading edge of the uppermost one of the film sheets S.

The printer P further includes a pair of feed rollers 64, a support plate 65 and an auxiliary scanning drum 70. The feed rollers 64 are movably provided so as to be moved in the leftward and rightward directions in FIG. 1 at a height substantially equal to that of the leading edge of the lifted film sheet S. In response to a signal for starting transport of the film sheets S, the feed rollers 64 are moved in the rightward direction in FIG. 1 while being rotated. Thus, the feed rollers 64 catch therebetween the leading edge of the lifted film sheet S and then immediately, transport the film sheet S onto the support plate 65. It is to be noted that rotation of the feed rollers 64 is stopped at the time when the film sheet S has been transported onto the support plate 65 by the feed rollers 64. The above described stop of the feed rollers 64 is performed for the purpose of eliminating unstable transport of the film sheet S on the subsequent auxiliary scanning drum 70 due to vibration of the feed rollers 64. The support plate 65, which has a length slightly larger than that of the film sheet S and has an upper face so finished as to allow the film sheet S to be slidably moved thereon, is horizontally provided in a sheet transport path extending from the feed rollers 64 to the auxiliary scanning drum 70.

The printer S further includes a push lever 66, shafts 67 and 69, a stopper 68 and a pair of nip rollers 71 disposed above the auxiliary scanning drum 70. The push lever 66 and the stopper 68 are, respectively, disposed adjacent to the feed rollers 64 and the auxiliary scanning drum 70 and are pivotally provided so as to be pivoted about the shafts 67 and 69, respectively such that the push lever 66 and the stopper 68 are retractably projected into the sheet transport path. When the push lever 66 is pivoted into the sheet transport path in the clockwise direction in FIG. 1, the push lever 66 urges the trailing edge of the film sheet S in the leftward direction in FIG. 1. Meanwhile, the stopper 68 has a hooked end portion. When the stopper 68 is pivoted into the sheet transport path in the counterclockwise direction in FIG. 1, the hooked end portion of the stopper 68 is brought into contact with the leading edge of the film sheet S so as to accurately position the film sheet S on the support plate 65.

Initially, after the stopper 68 has been projected into the sheet transport path and the push lever 66 has been retracted from the sheet transport path, the film sheet S is carried onto the support plate 65 by the feed rollers 64. Then, the push lever 66 is pivoted in the clockwise direction in FIG. 1 so as to depress the trailing edge of the film sheet S in the leftward direction in FIG. 1, so that the leading edge of the film sheet S is brought into contact with the stopper 68 such that the film sheet S is positioned on the support plate 65. Subsequently, the push lever 66 is pivoted in the counterclockwise direction in FIG. 1 at such a low speed as not to displace the film sheet S, while the stopper 68 is pivoted in the clockwise direction in FIG. 1 so as to be retracted from the sheet transport path. Thereafter, when the push lever 66 is again pivoted in the clockwise direction in FIG. 1 so as to depress the trailing edge of the film sheet S, the film sheet S is further transported in the leftward direction in FIG. 1 and the leading edge of the film sheet S is caught between the auxiliary drum 70 and the nip rollers 71. The auxiliary scanning drum 70 is continuously rotated in the counterclockwise direction in FIG. 1 during a printing operation of the printer P and the nip rollers 71 are at all times brought into contact with the auxiliary scanning drum 70 so as to be rotated by the auxiliary scanning drum 70. When the film sheet S is caught between the auxiliary scanning drum 70 and the nip rollers 71, the film sheet S is immediately carried in the leftward direction in FIG. 1 by a rotary force of the auxiliary scanning drum 70.

Furthermore, the printer P includes a laser beam unit 72, a beam generator 73 for generating laser beams, a reflecting mirror 74, a take-up cassette 75 and a control cabinet 76 disposed at a lower portion of a printer housing H. The laser beam unit 72 is disposed above the support plate 65. Laser beams generated by the beam generator 73 are irradiated, through the reflecting mirror 74, between the nip rollers 71 such that the film sheet S proceeding on the auxiliary scanning drum 70 is subjected to main scanning, whereby a predetermined image is formed on the film sheet S.

The film sheet S having the image thus formed thereon is carried in the leftward direction in FIG. 1 from between the auxiliary scanning drum 70 and the nip rollers 71 and then, drops down into the take-up cassette 75 by its own weight. The take-up cassette 75 includes a cover for selectively covering and uncovering an opening of the take-up cassette 75 upon detection of transport of the film sheet S. Thus, the take-up cassette 75 is sufficiently shielded from light by the cover. The film sheets S thus received in the take-up cassette 75 have been subjected only to exposure. Subsequently, the take-up cassette 75 containing the exposed film sheets S is taken out of the printer housing H such that the exposed film sheets S are processed by a developing device and a fixing device.

Figure 2:
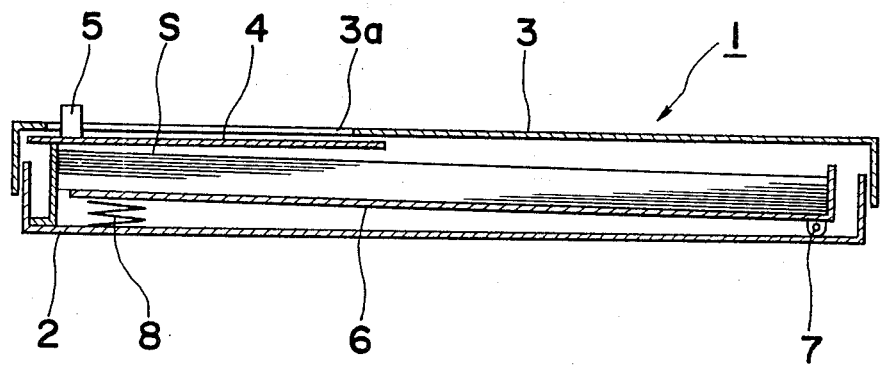
FIG. 2 is a cross-sectional view of a supply cassette employed in the cassette receiving arrangement of FIG. 1.
Figure 3:
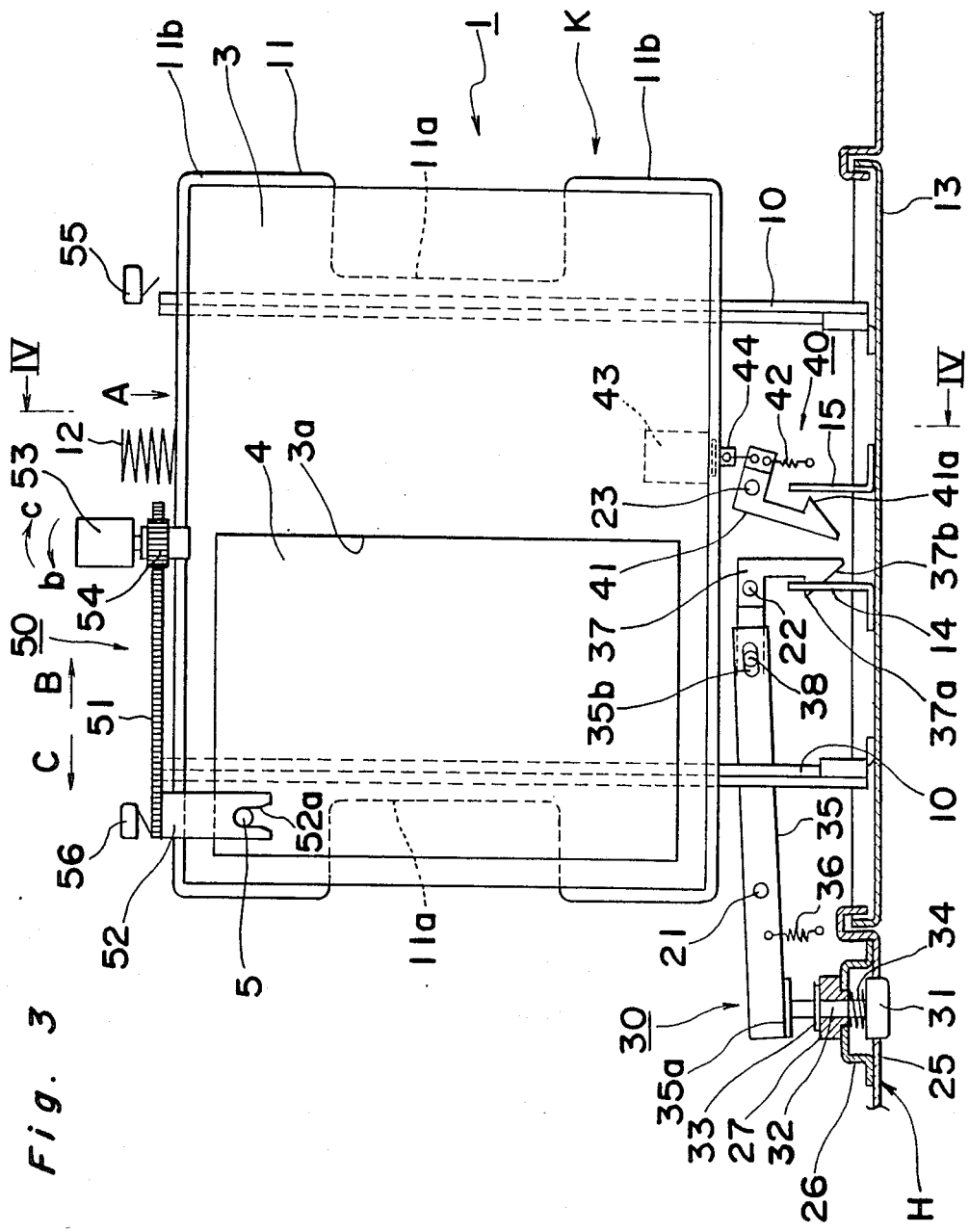
FIG. 3 is a top plan view of the cassette receiving arrangement of FIG. 1.

Referring now to FIGS. 2 to 4, there are shown the supply cassette 1 and the arrangement K for detachably receiving the supply cassette 1. As shown in FIG. 2, the supply cassette 1 is constituted by a casing 2, an upper cover 3 for detachably covering an upper opening of the casing 2, a light shielding cover 4 and a retainer plate 6 for retaining the film sheets S thereon. The light shielding cover 4 is slidable in the leftward and rightward directions in FIG. 2 to selectively cover and uncover an opening 3a of the upper cover 3. The retainer plate 6 is pivotally provided so as to be pivoted upwardly and downwardly about a shaft 7 and is urged upwardly at all times by a spring 8 disposed between the retainer plate 6 and a bottom wall of the casing 2. The photosensitive film sheets S are stacked on the retainer plate 6 in a darkroom by removing the upper cover 3 from the casing 2. The light shielding cover 4 usually covers the opening 3a but is driven at the time of each printing operation by a drive means 50, to be described later, so as to uncover the opening 3a. The film sheets S are taken out of the supply cassette 1 one sheet at a time through the opening 3a when the opening 3a is uncovered by the light shielding cover 4. Meanwhile, it is so arranged that an urging force of the spring 8 changes in accordance with changes of the number of the film sheets S remaining on the retainer plate 6, i.e., changes of thickness and weight of the remaining film sheets S, such that the leading edge of the uppermost one of the film sheets S is maintained at a predetermined height from the bottom wall of the casing 2 even if the number of the film sheets S stacked on the retainer plate 6 changes.

As shown in FIGS. 3 and 4, the arrangement K generally includes a mechanical lock means 30, an electrical lock means 40 and the drive means 50. The arrangement K includes a pair of rails 10 each having a fixed rail and a movable rail slidably mounted on the fixed rail. The fixed rail of each of the rails 10 is mounted on an inner frame (not shown), while a cassette stand 11 formed with a pair of recesses 11a and a pair of opposing flanges 11b is secured to the movable rail of each of the rails 10. One end of the movable rail of each of the rails 10 is attached to a panel 13. After the cassette stand 11 has been drawn out of the printer housing H including a front frame 25, the supply cassette 1 is placed on the cassette stand 11 so as to be positioned by the flanges 11b and then, is pushed into the printer housing H. At this time, a compression spring 12 is brought into contact with the cassette stand 11 so as to urge the cassette stand 11 in the direction indicated by the arrow A in FIGS. 3 and 4. However, since the panel 13 is locked by the mechanical lock means 30 and the electrical lock means 40, the panel 13 is kept flush with the front frame 25. Meanwhile, the recesses 11a are formed on the cassette stand 11 such that the supply cassette 1 can be easily mounted on or removed from the cassette stand 11.

The mechanical lock means 30 is constituted by a push button 31, a lever 35 and a hook 37. The push button 31 has a rod portion 32 and the rod portion 32 is slidably mounted, through a bearing 27, on a bracket 26 attached to an inner face of the front frame 25. A retaining ring 33 fitted around the rod portion 32 prevents the push button 31 from being drawn out of the front frame 25, while a coiled spring 34 wound around the rod portion 32 urges the push button 31 at all times out of the front frame 25 such that the push button 31 projects out of the front frame 25. The lever 35 is pivotally mounted on a pin 21 fixed to a base 20. The lever 35 is urged in the counterclockwise direction in FIG. 3 by a coiled tension spring 36 such that a contact piece 35a formed at one end of the lever 35 is held in contact with the rod portion 32 of the push button 31. The hook 37 is pivotally mounted on a pin 22 secured to the base 20. A pin 38 is secured to one end of the hook 37 and the hook 37 is formed, at the other end thereof, with an inclined face 37b. A pawl portion 37a is formed at an edge of the inclined face 37b. The pin 38 secured to the hook 37 is loosely fitted into an elongated opening 35b formed at the other end of the lever 35. Meanwhile, the pawl portion 37a of the hook 37 is engageable with an opening (not shown) of a locking piece 14 secured to an inner face of the panel 13. When the supply cassette 1 has been loaded into the printer housing H, the lever 35 is urged in the counterclockwise direction in FIG. 3 by the coiled tension spring 36 so as to urge the hook 37 in the clockwise direction in FIG. 3, so that the pawl portion 37a of the hook 37 is engaged with the opening of the locking piece 14. On the other hand, when the push button 31 is depressed against an urging force of the coiled tension spring 36, the lever 35 is rotated in the clockwise direction in FIG. 3 so as to rotate the hook 37 in the counterclockwise direction in FIG. 3, so that the pawl portion 37a is disengaged from the opening of the locking piece 14 and thus, locking of the supply cassette 1 by the mechanical lock means 30 is cancelled.

The electrical lock means 40 includes a hook 41 having a pawl portion 41a formed at one end thereof, a coiled tension spring 42 and an electromagnetic solenoid 43 having an actuator 44 coupled with one end of the hook 41. The hook 41 is pivotally mounted on a pin 23 secured to the base 20. The coiled tension spring 42 is attached to the one end of the hook 41 so as to urge the hook 41 in the clockwise direction in FIG. 3. The pawl portion 41a of the hook 41 is engageable with an opening 15a of a locking piece 15 attached to the inner face of the panel 13. The solenoid 43 is usually turned off but is turned on in response to a print start signal. Thus, when the solenoid 43 is turned on in response to the print start signal, the actuator 44 is retracted so as to pivot the hook 41 in the counterclockwise direction in FIG. 3, so that the pawl portion 41a is engaged with the opening 15a of the locking piece 15. Meanwhile, the solenoid 43 is turned off upon completion of the printing operation, so that the actuator 44 is projected so as to pivot the hook 41 in the clockwise direction in FIG. 3, so that the pawl portion 41a is disengaged from the opening 15a of the locking piece 15 and thus, locking of the supply cassette 1 by the electrical lock means 40 is cancelled.

The drive means 50 for driving the light shielding cover 4 includes a rack 51 movable in the opposite directions indicated by the arrows B and C in FIG. 3, a pinion 54 engageable with the rack 51, a lever 52 secured to the rack 51, and a motor 53. The pinion 54 is mounted on an output shaft of the motor 53. The lever 52 is formed with a groove 52a engageable with a pin 5 secured to the light shielding plate 4. Furthermore, limit switches 55 and 56 are, respectively, provided at opposite ends of a stroke of the rack 51. In response to the print start signal, the motor 53 is turned on so as to rotate the pinion 54 in the direction indicated by the arrow b in FIG. 3, so that the light shielding cover 4 is slidably moved together with the rack 51 in the rightward direction indicated by the arrow B in FIG. 3 so as to uncover the opening 3a of the supply cassette 1. Then, when the rack 51 is brought into contact with the limit switch 55, rotation of the motor 53 is stopped and thus, the rack 51 is prevented from being further moved in the rightward direction of the arrow B. Meanwhile, in response to a print completion signal, the motor 53 is again turned on so as to rotate the motor 53 in the direction indicated by the arrow c in FIG. 3, so that the light shielding cover 4 is slidably moved together with the rack 51 in the leftward direction indicated by the arrow C in FIG. 3 so as to cover the opening 3a of the supply cassette 1. Then, when the rack 51 is brought into contact with the limit switch 56, rotation of the motor 53 is stopped and thus, the rack 51 is prevented from being further moved in the leftward direction of the arrow C.

Namely, in the above described arrangement K, when the push button 31 is depressed, the hook 37 is pivoted, through the lever 35, in the counterclockwise direction in FIG. 3, so that locking of the supply cassette 1 by the mechanical lock means 30 is cancelled and thus, the cassette 1 can be drawn out of the printer housing H. However, when the light shielding cover 4 uncovers the opening 3a of the supply cassette 1 such that the film sheets S can be taken out of the supply cassette 1 upon starting of the printing operation, the solenoid 43 is turned on such that the supply cassette 1 is locked by the electrical lock means 40 through engagement of the pawl portion 41a of the hook 41 with the opening 15a of the locking piece 15. Thus, at this time, the supply cassette 1 cannot be taken out of the printer housing H even if locking of the supply cassette 1 by the mechanical lock means 30 is cancelled. Meanwhile, when electric power is not supplied to the arrangement K, the solenoid 43 is turned off such that locking of the supply cassette 1 by the electrical lock means 40 is cancelled, whereby the supply cassette 1 can be taken out of the printer housing H by depressing the push button 31.

Meanwhile, when locking of the supply cassette 1 by the mechanical lock means 30 is cancelled by depressing the push button 31, the cassette stand 11 is urged in the direction A by the compression spring 12 so as to be moved slightly out of the printer housing H. In the case where the supply cassette 1 is loaded into the printer housing H, it is only necessary to depress the cassette stand 11 into the printer housing H, so that the locking piece 14 rides over the inclined face 37b of the hook 37 so as to be brought into engagement with the pawl portion 37a of the hook 37 and, at the same time, the pin 5 of the light shielding cover 4 is brought into engagement with the groove 52a of the lever 52 of the drive means 50.

It is to be noted that the solenoid 43, motor 53, etc. are controlled by a sequence circuit or a microcomputer through combinations of printing signals and timers and these control devices are installed together with other control components in the control cabinet 76.

It should be further noted that the arrangement K of the present invention can be also applied to the take-up cassette 75 in FIG. 1. In the take-up cassette 75, a light shielding cover selectively covers and uncovers an opening of the take-up cassette 75 at the time of each printing operation such that the exposed film sheets are fed into the take-up cassette 75. Accordingly, in the take-up cassette 75, it is also necessary, as in the case of the supply cassette 1, to eliminate an operation wherein the take-up cassette 75 is inadvertently taken out of the printer housing H with the result that erroneous exposure of the film sheets S takes place.

As is clear from the foregoing description, the arrangement of the present invention includes the drive means for driving the light shielding cover such that the light shielding cover selectively covers and uncovers the opening of the cassette, the electrical lock means for locking the cassette on the basis of the electrical signal detecting that the opening of the cassette is uncovered by the light shielding cover, and the mechanical lock means for locking the cassette such that locking of the cassette by the mechanical lock means is cancelled upon manipulation of the mechanical lock means.

Thus, in accordance with the present invention, when the opening of the cassette is uncovered by the light shielding cover, the cassette is locked by the electrical lock means, so that the cassette cannot be taken out of the printer housing even if locking of the cassette by the mechanical lock means is cancelled and thus, it becomes possible to positively prevent erroneous exposure of the film sheets.

Furthermore, in accordance with the present invention, since the electrical lock means is not actuated when the power source is shut off, the cassette can be taken out of the printer housing even when the power source is shut off.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An arrangement for detachably receiving a cassette containing photosensitive film sheets, with the cassette being formed with an opening for passing the photosensitive film sheets therethrough and including a light shielding cover for selectively covering and uncovering the opening, said arrangement comprising:

a drive means for driving the light shielding cover to selectively cover and uncover the opening;

an electrical lock means for locking the cassette when the light shielding cover is at a position uncovering the opening;

a mechanical lock means for locking the cassette when the cassette is inserted into said arrangement; and a mechanical release means for releasing said mechanical lock means upon manipulation thereof to allow withdrawal of the cassette.

2. An arrangement as claimed in claim 1, wherein said electrical lock means comprises:

a locking piece which is attached to said arrangement;

a hook which is pivotally provided so as to be brought into and out of engagement with said locking piece; and an electromagnetic solenoid which includes an actuator coupled with said hook;

said hook being pivoted into engagement with said locking piece by said actuator in response to an electrical signal generated while the light shielding cover is at a position uncovering the opening.

3. An arrangement as claimed in claim 2, wherein said hook is pivoted out of engagement with said locking piece by said actuator in response to an electrical signal generated while the light shielding cover is at a position covering the opening.

4. An arrangement as claimed in claim 1, wherein said mechanical lock means comprises:

a locking piece which is attached to said arrangement;

a hook which is pivotally provided so as to be brought into and out of engagement with said locking piece; and a lever which is coupled with said hook at one end thereof;

said hook being pivoted into engagement with said locking piece to lock the cassette when the cassette is inserted into said arrangement.

5. An arrangement as claimed in claim 4, wherein said mechanical release means comprises:

a push button which is engaged with said lever at the other end thereof;

said hook being pivoted out of engagement with said locking piece to allow withdrawal of the cassette when said push button is depressed.

6. An arrangement for detachably receiving a cassette containing photosensitive film sheets, with the cassette being formed with an opening for passing the photosensitive film sheets therethrough and including a light shielding cover for selectively covering and uncovering the opening, said arrangement comprising:

a drive means for driving the light shielding cover to selectively cover and uncover the opening;

an electrical lock means for locking the cassette when the light shielding cover is at a position uncovering the opening and for unlocking the cassette when the light shielding cover is at a position covering the opening;

a mechanical lock means for locking the cassette when the cassette is inserted into said arrangement; and a mechanical release means for releasing the locking by said mechanical lock means, the cassette being detachable from said arrangement by said mechanical release means only when said electrical lock means has unlocked the cassette.

7. An assembly for detachably receiving a cassette containing photosensitive film sheets, the cassette being formed with an opening for passing the photosensitive film sheets therethrough and having a light shielding cover for selectively covering and uncovering the opening, said arrangement comprising:

a housing;

cassette stand means, slidably attached to said housing, for inserting and withdrawing a cassette into and out of said housing;

a drive means attached to said housing and engageable with a light shielding cover on a cassette for driving the light shielding cover to selectively cover and uncover the opening in the cassette;

an electrical lock means attached to said housing for locking the cassette in a position within said housing when the light shielding cover is at a position uncovering the opening;

a mechanical lock means attached to said housing for locking said cassette stand in a position within said housing when the cassette is inserted into said housing; and a mechanical release means attached to said housing for releasing said mechanical lock means upon manipulation thereof to allow withdrawal of the cassette on said cassette stand.

8. The assembly of claim 7, wherein said electrical lock means comprises:

a locking piece attached to said cassette stand;

a hook pivotally attached to said housing for movement into and out of engagement with said locking piece;

an electromagnetic solenoid having an actuator coupled to said hook for pivoting said hook into and out of engagement with said locking piece; and circuit means, operatively connected to said electromagnetic solenoid, for activating said electromagnetic solenoid when the light shielding cover is at a position uncovering the opening the cassette.

9. The assembly of claim 8, wherein said hook is pivoted out of engagement with said locking piece by said actuator in response to an electrical signal generated in said circuit means when said light shielding cover is in a position covering the opening in the cassette.

10. The assembly of claim 7, wherein said mechanical lock means comprises:

a locking piece attached to said cassette stand;

a hook pivotally attached to said housing for movement into and out of engagement with said locking piece; and a lever pivotally attached to said housing and coupled with said hook at one end thereof, the other end of said lever being connected to said mechanical release means whereby said cassette stand is locked in a position when the cassette is inserted into said housing.

11. The assembly of claim 10, wherein said mechanical release means comprises;

a push button mounted on said housing and slidably attached to said other end of said lever, whereby said hook is pivoted out of engagement with said locking piece to allow withdrawal of the cassette when said push button is depressed.

* * * * *